United States Patent [19]

Takago et al.

[11] 4,339,563

[45] Jul. 13, 1982

[54] NOVEL ORGANOPOLYSILOXANES AND ROOM TEMPERATURE CURABLE ORGANOPOLYSILOXANE COMPOSITIONS CONTAINING THE SAME

[75] Inventors: Toshio Takago; Masatoshi Arai; Koji Futatsumori, all of Annaka, Japan

[73] Assignee: Shin-Etsu Chemical Co., Ltd., Tokyo, Japan

[21] Appl. No.: 209,492

[22] Filed: Nov. 24, 1980

[30] Foreign Application Priority Data

Nov. 30, 1979 [JP] Japan .................... 54-155455

[51] Int. Cl.³ .................................. C08G 77/06
[52] U.S. Cl. .................................. 528/14; 528/15; 528/16; 528/17; 528/18; 528/19; 528/21; 528/22; 528/32; 528/33; 528/34; 528/35; 556/450
[58] Field of Search .......... 528/32, 35, 14, 15, 528/16, 17, 18, 19, 21, 22, 33, 34; 260/18 S; 556/450

[56] References Cited

U.S. PATENT DOCUMENTS

| | | | |
|---|---|---|---|
| 3,661,816 | 5/1972 | Pepe et al. | 528/35 |
| 3,684,793 | 8/1972 | Pepe et al. | 528/35 |
| 4,079,037 | 3/1978 | Frye et al. | 528/32 |
| 4,180,642 | 12/1979 | Takago | 528/32 |
| 4,248,993 | 2/1981 | Takago | 528/32 |

*Primary Examiner*—Melvyn I. Marquis
*Attorney, Agent, or Firm*—Toren, McGeady & Stanger

[57] ABSTRACT

The invention provides a novel and improved room temperature curable organopolysiloxane composition which is very stable over a long period of time if stored under an anhydrous condition but readily curable on exposure to moisture-containing atmosphere without producing no condensation products having toxicity, unpleasant odor or corrosiveness. The composition comprises, as the main component, an organopolysiloxane having at least three alkenyloxy groups bonded to the silicon atom or atoms in the organopolysiloxane molecule through a silhydrocarbylene linkage, e.g. silethylene linkage, and a curing accelerator.

10 Claims, No Drawings

NOVEL ORGANOPOLYSILOXANES AND ROOM TEMPERATURE CURABLE ORGANOPOLYSILOXANE COMPOSITIONS CONTAINING THE SAME

BACKGROUND OF THE INVENTION

The present invention relates to a novel class of organopolysiloxanes and a composition curable at room temperature containing the same.

In the prior art, several types of room temperature curable organopolysiloxane compositions are known which are storable over a long period of time under a hermetically sealed condition but curable when exposed to atmospheric air even at room temperature by reacting with atmospheric moisture to be converted into a rubbery elastomer. These room temperature curable organopolysiloxane compositions are classified into so-called two-package type ones and one-package type ones. The compositions of the former type are relatively unstable even in a sealed condition when all of the components have been blended together so that the composition is prepared in two packages each containing different components and the contents of the two packages are blended together directly before use to initiate the curing reaction as a sealing material, adhesive agent and the like.

On the other hand, the compositions of the latter type are sufficiently stable even when all of the components are blended together provided that exclusion of the atmospheric moisture is complete. Naturally, these one-package type compositions are preferred in most of applications to the two-package type ones by virtue of the convenience in their use.

One-package type room temperature curable organopolysiloxane compositions are cured on exposure to atmospheric air by the mechanism of a condensation reaction between functional groups bonded to the silicon atoms in the organopolysiloxane molecules. Therefore, the one-package type room temperature curable organopolysiloxane compositions are further classified according to the types of the condensation reaction or, in particular, according to the combination of the functional groups from which various kinds of condensation products are formed by the condensation reaction.

For example, conventional compositions of the type emit carboxylic acids such as acetic acid, amines, oximes or alcohols as the condensation product and they are called de-carboxylic acid type, deamination type, deoximation type and dealcoholation type ones, respectively. These compositions have, of course, their own advantages and disadvantages.

It is readily understood that the carboxylic acids, amines and oximes emitted from the respective compositions in the curing thereof are toxic or corrosive so that their use must be carried out under sufficient ventilation to avoid the problem of workers' health. In addition, their use on or in the vicinity of metal parts is not recommended due to the rusting by the corrosive condensation products even with an anticorrosion treatment by use of a primer or undercoating.

The dealcoholation type compositions are, on the other hand, free from the problem of corrosion or toxicity since an alcohol as the condensation product is non-corrosive and may be non-toxic as in ethyl alcohol. The dealcoholation type compositions are, however, defective in different ways that the storability of the composition is relatively poor, the curing velocity at room temperature is low taking unduly long time for complete curing, especially, when the layer of the composition to be cured is thick and the mechanical properties of the cured products thereof are inferior with brittleness.

Further, there has been proposed a room temperature curable organopolysiloxane composition curable by the mechanism in which a ketone is formed as the condensation product in the crosslinking reaction with the atmospheric moisture (see, for example, Japanese Patent Publication 42-23567). The curable compositions of this type are free from the problems of corrosion or toxicity but are defective in the lack of adhesivity on the surface of metals or plastics.

SUMMARY OF THE INVENTION

It is therefore the primary object of the present invention to provide a novel and improved room temperature curable organopolysiloxane composition free from the above described problems of the prior art compositions which is very stable as ready-mixed under a hermetically sealed condition but rapidly cured on exposure to moisture-containing atmosphere exhibiting good adhesion on to the surfaces of various kinds of materials, especially, metals forming no corrosive or toxic gas as the condensation product and is widely applicable as a sealing material, caulking material, adhesive agent, coating material, material for electric insulation, material for molds, rubbercasting material, wrapping material for foodstuff and the like.

In the course of their investigations to develop such a novel and improved organopolysiloxane composition, the inventors have arrived at a discovery of a novel class of organopolysiloxanes hitherto not known or not described in any prior art literatures and also at a discovery that a composition formulated with the above mentioned novel organopolysiloxane as the base ingredient well satisfies the requirements to overcome the disadvantages in the prior art compositions as mentioned above to establish the present invention.

Thus, the newly discovered organopolysiloxanes are characteristic in the type of the functional groups bonded to the silicon atoms of the organopolysiloxane molecules by having, in a molecule, at least one alkenyloxy-substituted silylhydrocarbyl group directly bonded to the silicon atom of the polysiloxane linkage as represented by the general formula

(I)

in which A is an alkenyloxy group, $R^1$ is a substituted or unsubstituted monovalent hydrocarbon group, $R^2$ is a divalent hydrocarbon group and a is a number of 2 or 3.

Further, the room temperature curable organopolysiloxane composition of the present invention comprises (a) 100 parts by weight of the above described, newly discovered organopolysiloxane and (b) from 0.01 to 15 parts by weight of a curing accelerator.

DETAILED DESCRIPTION OF THE PREFERRED EMBODIMENTS

The newly discovered organopolysiloxane, which can be the main component (a) in the inventive composition, is an organopolysiloxane having, in a molecule, at least one alkenyloxysubstituted silylhydrocarbyl group of the above general formula (I) bonded directly to the silicon atom of the organopolysiloxane linkage. Organopolysiloxanes of this type are very stable in the absence of moisture but readily crosslinked to give a cured product in the presence of atmospheric moisture and a curing accelerator as described hereinafter selected from not only tinor titanium-containing ones but also ones not containing tin or titanium. The cured products thereof have excellent mechanical properties and rubbery elasticity along with good heat resistance and anit-weathering resistance and are free from tackiness on the surface. Further advantageously, the compositions produce in the curing no gaseous condensation products having unpleasant odor, toxicity and corrosiveness.

In the above given general formula (I), the symbol A denotes an alkenyloxy group as exemplified by vinyloxy group, isopropenyloxy group, 1-phenylvinyloxy group, 1-isobutenyloxy group, 1,4-dimethyl-1-pentenyloxy group and the like. The symbol $R^1$ in the formula denotes a substituted or unsubstituted monovalent hydrocarbon group exemplified by alkyl groups such as methyl, ethyl, propyl and butyl groups, cycloalkyl groups such as cyclopentyl and cyclohexyl groups, aryl groups such as phenyl and tolyl groups and aralkyl groups such as benzyl group as well as those groups derived from the above named hydrocarbon groups by the substitution of halogen atoms or cyano or other groups for part or all of the hydrogen atoms therein. When the organopolysiloxane molecule has two or more of the groups $R^1$, they may not be the same ones but can be different ones.

The symbol $R^2$ in the formula denotes a divalent hydrocarbon group exemplified by alkylene groups such as ethylene, propylene and butylene groups as well as those groups derived from the above named alkylene groups by the substitution of halogen atoms or the like for part or all of the hydrogen atoms therein. In particular, it is preferable in the present invention that the group $R^2$ has from 2 to 8 carbon atoms or more preferable that the group $R^2$ is an ethylene group so as that the alkenyloxy groups A are bonded to the organopolysiloxane molecule through a silethylene linkage.

The number a is, as is mentioned before, 2 or 3 but it is preferable that a molecule of the organopolysiloxane has at least three alkenyloxy groups bonded to the silicon atoms through, for example, silethylene linkages. That is, it is sufficient that the organopolysiloxane molecule has at least one alkenyloxy-containing group of the general formula (I) when the number a is equal to 3 but, when a is equal to 2, it is desirable that the organopolysiloxane molecule has at least two of the alkenyloxy-containing groups of the general formula (I) so as that the molecule has 3 or more alkenyloxy groups in order to exhibit satisfactory curing performance.

Meanwhile, an organopolysiloxane haveing one or more of the groups of the formula (I) in which a is 1 can also be synthesized but an organopolysiloxane composition formulated therewith is less preferred due to the very low reactivity of the functional groups even when the organopolysiloxane molecule has three or more of the groups (I).

The alkenyloxy-containing organopolysiloxane as the component (a) is readily synthesized, for example, by the addition reaction between an organopolysiloxane having at least one aliphatically unsaturated group, e.g. vinyl group, bonded to the silicon atom in a molecule and an organosilicon compound, e.g. organosilane, having a hydrogen atom directly bonded to the silicon atom and two or three alkenyloxy groups bonded to the same silicon atom in the presence of a catalyst for the addition reaction which is preferably a salt or a complex of a metal belonging to the Eighth Group of the Periodic Table such as platinum. The proceeding of the above described addition reaction can be monitored by several analytical means such as the determination of the silicon-bonded hydrogen atoms or silicon-bonded alkenyloxy groups, gas chromatography, infrared absorption spectral analysis and the like.

Though not limitative, the organopolysiloxane used as the component (a) in the present invention has preferably a viscosity in the range from 100 to 500,000 centistokes at 25° C. from the standpoint of the balance of the workability of the composition and the properties of the cured products obtained therefrom.

Several exemplary structures of the organopolysiloxanes suitable as the component (a) are given by the following formulas, in which the symbols Me and Ph denote a methyl and phenyl group, respectively, and $A^1$, $A^2$ and $A^3$ each denote an alkenyloxy group given below.

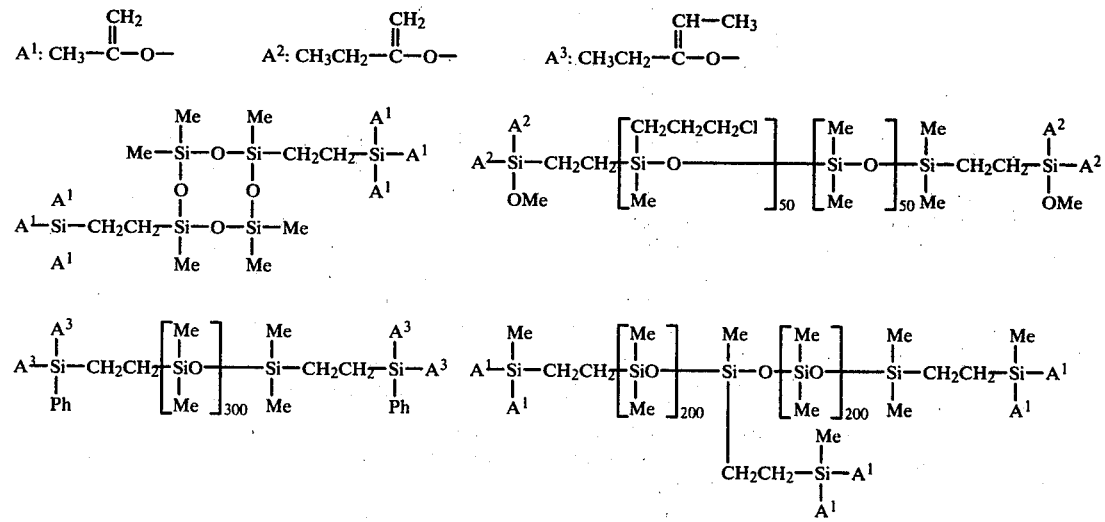

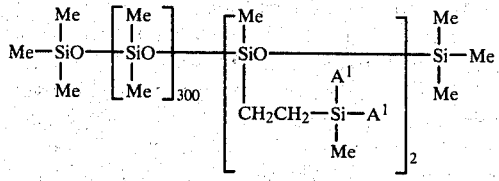

The component (b) used in combination with the above described alkenyloxy-containing organopolysiloxane as the component (a) is a curing accelerator and can be selected from a wide variety of conventional curing accelerators effective for the condensation reactions of organopolysiloxanes. Typical examples of suitable curing accelerators, are as follows: metal salts of carboxylic acids such as potassium acetate, sodium acetate, lithium oxalate, lead 2-ethylhexoate, dibutyltin diacetate, dibutyltin dilaurate, butyltin tri(2-ethylhexoate), iron 2-ethylhexoate, cobalt 2-ethylhexoate, manganese 2-ethylhexoate, zinc 2-ethylhexoate, tin(II) caprylate, tin naphthenate, tin oleate, tin butyrate, titanium naphthenate, zinc naphthenate, cobalt naphthenate, zinc stearate and the like; organic titanate esters and other titanium-containing compounds such as tetrabutyl titanate, tetra(2-ethylhexyl) titanate, triethanolamine titanate, tetra(isopropenyloxy) titanate, organosiltitanoxanes and the like; alkoxyaluminum compounds such as aluminum triisopropoxide and the like; aminoalkyl-substituted alkoxysilanes such as 3-aminopropyl triethoxysilane, N-(trimethoxysilyl) ethylenediamine and the like; amine compounds and salts thereof such as hexylamine, dodecylamine phosphate and the like; quaternary ammonium salts such as benzyl triethylammonium acetate and the like; dialkyl hydroxylamines such as dimethyl hydroxylamine, diethyl hydroxylamine and the like; and tetramethylguanidine and guanidyl-containing organosilanes and organopolysiloxanes expressed, for example, by the structural formulas

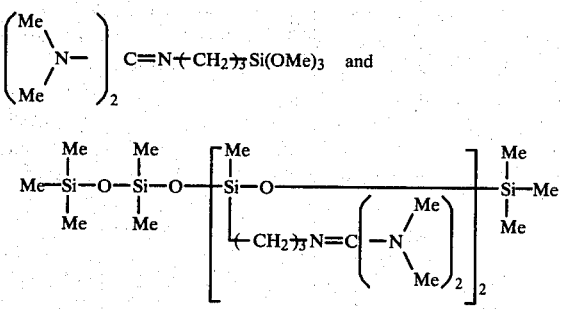

The above named curing accelerators may be used either singly or as a combination of two kinds or more according to need.

In particular, the curing accelerators of the last-mentioned class, that is, the guanidine compounds and the guanidyl-containing organosilanes and organopolysiloxanes are preferable from the standpoint of obtaining an adequate curing velocity as well as excellent adhesive strength to the substrate surface.

The amount of the curing accelerator to be formulated in the inventive composition is determined naturally according to the types of the organopolysiloxane as the component (a) and the curing accelerator itself and the desired curing velocity. Generally speaking, the amount of the curing accelerator is in the range from 0.01 to 15 parts by weight or, preferably, from 0.1 to 8 parts by weight per 100 parts by weight of the organopolysiloxane as the component (a). When the amount is smaller than the above range, no sufficient curing velocity is naturally obtained taking unduly long time for complete and uniform curing, especially, in the depth of a relatively thick layer of the composition while, on the other hand, an excessively large amount of the curing accelerator is disadvantageous owing to the decreased workability of the composition with extremely rapid skin formation on the surface as well as the inferior heat resistance and anti-weathering resistance of the cured product thereof.

The room temperature curable composition of the present invention may contain various kinds of particulate or fibrous fillers according to need as exemplified by fumed silica, precipitated silica, quartz powder, diatomaceous earth, calcium carbonate, calcium carbonate surface-treated with a fatty acid, magnesium carbonate, carbon black, clay, calcined clay, titanium dioxide, zinc oxide, $\alpha$- and $\gamma$-iron oxides, bentonite, organic complexes of bentonite, glass powder, glass microballons, asbestos, glass fibers, mica powder, powders of fused quartz and other inorganic fillers as well as organic fillers such as finely pulverized polystyrene, polyvinyl chloride, polypropylene and the like.

Further, the inventive composition may be formulated with a dehydrating agent or storability improver such as oximesilanes, oxime-containing organopolysiloxanes, aminosilanes, amino-containing organopolysiloxanes, amidosilanes, amido-containing organopolysiloxanes, dialkylaminoxysilanes, dialkylaminoxy-containing organopolysiloxanes, alkenyloxysilanes, alkenyloxy-containing organopolysiloxanes free from silhydrocarbylene linkages, alkoxysilanes, alkoxy-containing organopolysiloxanes and the like.

It may be too much to say that the above mentioned fillers and the silane or organopolysiloxane compounds are fuormulated in the composition in amounts not to unduly impair the desired properties of the compositions. These additive ingredients are desirably thoroughly dried before incorporation into the composition.

The inventive composition may of course be formulated with various kinds of other conventional additive ingredients such as pigments, dyes, aging retarders, anti-oxidants, anti-static agents, flame retardants, e.g. antimony oxide, chlorinated paraffins and the like, heat conductivity improvers, e.g. boron nitride and the like, and carbon-functional silanes containing amino groups, epoxy groups or thiol groups as an adhesivity improving agent.

The composition of the invention is prepared by uniformly blending the components (a) and (b) along with the other optional additive ingredients in an atmosphere of dry air or dry nitrogen. The inventive composition is sufficiently stable and storable over a long period of time even when all of the components are blended together in advance into one package provided that the preparation of the composition has been carried out in a substantially anhydrous condition and the composition is stored in a hermetically sealed container with exclusion of atmospheric moisture.

It is of course optional that the component (a) and the component (b) are separately prepared and they are blended together directly before the use of the composition. Components other than the components (a) and (b) may be blended in advance with either one or both of the components (a) and (b) or, alternatively, may be blended with the components (a) and (b) directly before use of the composition.

If necessary for a particular application, the composition of the present invention may be diluted with an organic solvent such as halogenated hydrocarbon solvents, aromatic hydrocarbon solvents, alcohol solvents, ketone solvents, ester solvents and the like.

In the following, the room temperature curable organopolysiloxane composition of the present invention is described in further detail by way of examples accompanied by comparative examples. The procedures for the preparation of the newly discovered alkenyloxy-containing organopolysiloxanes are first described in Preparations 1 and 2 below and then the preparation and application of the room temperature curable organopolysiloxane compositions formulated with the organopolysiloxanes are described in Examples 1 to 4. In the Examples, parts are all given by parts by weight.

Preparation 1

Into a reaction vessel were introduced 150 g of a dimethylpolysiloxane end-blocked at the molecular chain terminals with dimethylvinylsilyl groups having an average molecular weight of about 30,000 to exhibit a viscosity of about 4000 centistokes at 25° C., 0.1 g of an isopropyl alcohol solution of chloroplatinic acid in a concentration of 2% by weight as platinum and 100 g of toluene to form a reaction mixture, into which 1.6 g of methyldi(isopropenyloxy)silane, the amount being equimolar to the vinyl groups in the organopolysiloxane, were added dropwise over a period of 5 minutes while the reaction mixture was heated at 90° C. under agitation. After completion of the addition of the silane, the reaction mixture was further agitated continuedly for 3 hours at 110° C. to effect the addition reaction. After cooling, the reaction mixture was analyzed gas chromatographically for the content of the unreacted methyldi(isopropenyloxy)silane to find that 97% of the silane had reacted with the vinyl groups in the organopolysiloxane by the addition reaction. Removal of the volatile matter from the reaction mixture by stripping under reduced pressure gave a reaction product having a viscosity of about 4600 centistokes at 25° C. The molecular structure of this reaction product, inferable from the procedure of the preparation, is as follows, in which the symbols Me and $A^1$ each have the same meaning as defined before.

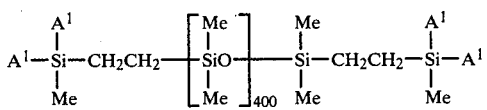

Preparation 2

Into a reaction vessel were introduced 450 g of a diorganopolysiloxane mainly composed of dimethylsiloxane units with 0.50% by moles of vinylmethylsiloxane units and end-blocked at the molecular chain terminals with trimethylsilyl groups having an average molecular weight of about 45,000 to exhibit a viscosity of about 20,000 centistokes at 25° C., 0.2 g of the same isopropyl alcohol solution of chloroplatinic acid as used in Preparation 1 above and 200 g of toluene to form a reaction mixture, into which 5.7 g of methyldi(1-isobutenyloxy)silane, the amount being equimolar to the vinyl groups in the diorganopolysiloxane, were added dropwise over a period of 10 minutes while the reaction mixture was agitated at 90° C. After completion of the addition of the silane, the reaction mixture was further agitated at 110° C. for 3 hours to effect the addition reaction. After cooling, the reaction mixture was analyzed gas chromatographically for the content of the unreacted silane to find that 92% of the silane had reacted with the vinyl groups in the organopolysiloxane by the addition reaction. Removal of the volatile matter from the reaction mixture by stripping under reduced pressure gave a reaction product having a viscosity of about 23,000 centistokes at 25° C. Analysis of this reaction product indicated that it was an organopolysiloxane containing 0.46% by moles of the units expressed by the formula:

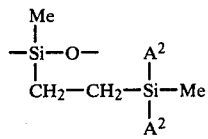

in which Me and $A^2$ each have the same meaning as defined before.

EXAMPLE 1

A composition prepared by blending 100 parts of the alkenyloxy-containing organopolysiloxane obtained in Preparation 1 and 0.5 part of tetra(isopropenyloxy) titanate was spread on a plate of a fluorocarbon resin into a sheet of 2 mm thickness and kept standing for 7 days in an atmosphere of 60% relative humidity at 20° C. to be converted into a cured rubber sheet. The mechanical properties of this rubber sheet as determined according to JIS K 6301 were: ultimate elongation at break 260%; tensile strength 4.9 kg/cm$^2$; and hardness 11.

EXAMPLE 2

A master composition was prepared by uniformly blending 100 parts of the alkenyloxy-containing organopolysiloxane obtained in Preparation 1, 20 parts of a dimethylpolysiloxane terminated at both chain ends with trimethylsilyl groups and having a viscosity of about 100 centistokes at 25° C. and 90 parts of a precipitated calcium carbonate in a substantially anhydrous atmosphere.

A composition prepared by blending 100 parts of the above obtained master composition, 1 part of 3-aminopropyl triethoxysilane and 0.5 part of 3-(trimethoxysilylpropyl) tetramethylguanidine was spread on a plate of a fluorocarbon resin into a sheet of 2 mm thickness and cured in the same conditions as in Example 1. The mechanical properties of the thus obtained cured rubber sheet were: ultimate elongation at break 610%; tensile strength 15 kg/cm$^2$; and hardness 27.

In the next place, an adhesive bonding test was undertaken with the above prepared curable composition. Thus, a small portion of the composition was sandwiched between a pair of test panels of a float glass or aluminum anodically oxidized in a sulfuric acid bath and coated with a methacrylate lacquer with baking in the middle part thereof to give a test specimen having an H-wise cross section. This test specimen was kept standing for 7 days in an atmosphere of 60% relative humidity at 20° C. and then at 30° C. for 14 days to cure the composition into a rubbery product.

The test panels of the thus obtained test specimen having an H-wise cross section were pulled apart by use of an automatic recording tensile tester to breakage in a velocity of 50 mm/minute and the maximum tensile strength in kg/cm$^2$ to the breakage was recorded for the test specimens as cured and after immersion in water at 50° C. for 7 days. The results are shown in Table 1 below. In the above pulling test of the test specimens, the test specimens were always destroyed in the body of the cured rubbery composition and never in the interface between the test panel and the cured rubbery composition reagrdless of whether before or after immersion in the hot water.

TABLE 1

| Test panel | (Tensile strength, kg/cm$^2$) | |
|---|---|---|
| | As cured | After 7 days in water at 50° C. |
| Glass | 7.0 | 6.4 |
| Aluminum | 6.9 | 6.2 |

To examine the storability of the above prepared curable composition, the composition was packed in a tube of aluminum foil and kept standing in a thermostatted water bath at 35° C. for 3 months. The appearance, fluidity and curing performance as well as the adhesive bonding of the composition after storage were almost identical with those directly after preparation of the composition.

EXAMPLE 3

The formulation of the curable composition was the same as in Example 2 except that the amount of the organopolysiloxane obtained in Preparation 1 was decreased to 30 parts instead of 100 parts and 70 parts of the organopolysiloxane obtained in Preparation 2 were added. Curing of the curable composition was undertaken in the same conditions as in Example 2 to give a cured rubbery composition. The mechanical properties of this cured rubbery composition were: ultimate elongation at break 700%; tensile strength 13 kg/cm$^2$; and hardness 25.

EXAMPLE 4

A master composition was prepared by uniformly blending 100 parts of the alkenyloxy-containing organopolysiloxane obtained in Preparation 2, 30 parts of a dimethylpolysiloxane terminated at both chain ends with trimethylsilyl groups and having a viscosity of about 100 centistokes at 25° C. and 40 parts of a fumed silica filler having a specific surface area of 130 m$^2$/g in a substantially anhydrous condition.

A composition prepared by blending 100 parts of the above prepared master composition, 1 part of vinyl tri(isopropenyloxy) silane and 0.5 part of 3-(trimethoxysilylpropyl) tetramethyguanidine was spread on a plate of a fluorocarbon resin into a sheet of 2 mm thickness and kept standing for 7 days in an atmosphere of 60% relative humidity at 20° C. to be converted into a cured rubbery sheet. The mechanical properties of this cured rubbery sheet were: ultimate elongation at break 750%; tensile strength 14 kg/cm$^2$; and hardness 26.

COMPARATIVE EXAMPLE 1

A master composition was prepared with the same formulation as in Example 2 except that the alkenyloxy-containing organopolysiloxane was replaced with the same amount of a dimethylpolysiloxane terminated at both chain ends with hydroxy groups and having a viscosity of about 2800 centistokes at 25° C. This master composition was blended with 5% by weight of vinyl trimethoxysilane, 1% by weight of 3-aminopropyl triethoxysilane and 0.5% by weight of 3-(trimethoxysilylpropyl) tetramethylguanidine and the composition was spread into a sheet and kept for 14 days in an atmosphere of 60% relative humidity at 20° C. without curing at all.

COMPARATIVE EXAMPLE 2

The formulation of the organopolysiloxane composition was the same as in Comparative Example 1 except that 3-(trimethoxysilylpropyl) tetramethylguanidine was replaced with the same amount of dibutyltin dilaurate. This composition was spread into sheet and cured in the same conditions as in Example 2 to be converted into a cured sheet having mechanical properties of: ultimate elongation at break 360%; tensile strength 11 kg/cm$^2$; and hardness 24.

Adhesive bonding test was undertaken with this composition in the same manner as in Example 2 by use of test panels of glass and aluminum. The tensile strengths for pulling apart the test panels of the specimens having an H-wise cross section were as given in Table 2 below. Breakage of the test specimen took place in the body of the cured composition as cured with the glass test panels but always took place after immersion in hot water for 7 days with the glass test panels and both before and after immersion in hot water with the aluminum test panels.

TABLE 2

| Test panel | (Tensile strength, kg/cm$^2$) | |
|---|---|---|
| | As cured | After 7 days in water at 50° C. |
| Glass | 5.1 | 3.2 |
| Aluminum | 3.4 | 2.7 |

What is claimed is:

1. A room temperature curable organopolysiloxane composition which comprises (a) 100 parts by weight of an alkenyloxy-containing organopolysiloxane having, in a molecule, at least one alkenyloxysubstituted silylhydrocarbyl group directly bonded to the silicon atom in the siloxane linkage of the organopolysiloxane as represented by the general formula:

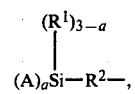

in which A is an alkenyloxy group, $R^1$ is a substituted or unsubstituted monovalent hydrocarbon group, $R^2$ is a divalent hydrocarbon group and a is a number of 2 or 3, and (b) from 0.01 to 15 parts by weight of a curing accelerator.

2. The room temperature curable organopolysiloxane composition as claimed in claim 1 wherein the alkenyloxy group is selected from the class consisting of vinyloxy, isopropenyloxy, 1-phenylvinyloxy, 1-isobutenyloxy and 1,4-dimethyl-1-pentenyloxy group.

3. The room temperature curable organopolysiloxane composition as claimed in claim 1 wherein the divalent hydrocarbon group denoted by the symbol $R^2$ is an alkylene group having from 2 to 8 carbon atoms.

4. The room temperature curable organopolysiloxane composition as claimed in claim 3 wherein the alkylene group is an ethylene group.

5. The room temperature curable organopolysiloxane composition as claimed in claim 1 wherein the organopolysiloxane contains at least three alkenyloxy groups in a molecule.

6. The room temperature curable organopolysiloxane composition as claimed in claim 1 wherein the organopolysiloxane has a viscosity in the range from 100 to 500,000 centistokes at 25° C.

7. The room temperature curable organopolysiloxane composition as claimed in claim 1 wherein the curing accelerator is selected from the class consisting of metal salts of carboxylic acids, organic titanate esters, alkoxyaluminum compounds, aminoalkylsubstituted alkoxysilane compounds, quaternary ammonium salts, dialkyl hydroxylamines, tetramethylguanidine and guanidyl-containing organosilanes and organopolysiloxanes.

8. The room temperature curable organopolysiloxane composition as claimed in claim 1 wherein the amount of the curing accelerator is in the range from 0.1 to 8 parts by weight per 100 parts by weight of the organopolysiloxane as the component (a).

9. An alkenyloxy-containing organopolysiloxane having, in a molecule, at least one alkenyloxy-substituted silylhydrocarbyl group directly bonded to the silicon atom in the siloxane linkage of the organopolysiloxane as represented by the general formula:

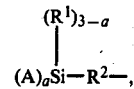

in which A is an alkenyloxy group, $R^1$ is a substituted or unsubstituted monovalent hydrocarbon group, $R^2$ is a divalent hydrocarbon group and a is a number of 2 or 3.

10. The composition of claim 1 wherein the curing accelerator is hexylamine or dodecylamine phosphate.

* * * * *